United States Patent [19]

Yoshino

[11] Patent Number: 5,166,456
[45] Date of Patent: Nov. 24, 1992

[54] LUMINESCENT PHOSPHOR COMPOSITION

[75] Inventor: Masahiko Yoshino, Odawara, Japan
[73] Assignee: Kasei Optonix, Ltd., Tokyo, Japan
[21] Appl. No.: 408,939
[22] PCT Filed: Dec. 10, 1986
[86] PCT No.: PCT/JP86/00626
§ 371 Date: Jul. 13, 1987
§ 102(e) Date: Jul. 13, 1987
[87] PCT Pub. No.: WO87/03611
PCT Pub. Date: Jun. 18, 1987

Related U.S. Application Data

[63] Continuation of Ser. No. 079,900, Jul. 13, 1987, abandoned.

[30] Foreign Application Priority Data

Dec. 16, 1985 [JP] Japan .................................. 60-281146
Apr. 17, 1986 [JP] Japan .................................. 61-87174
Jun. 16, 1986 [JP] Japan .................................. 61-138343

[51] Int. Cl.$^5$ .............................................. C09K 11/84
[52] U.S. Cl. ...................... 252/301.40 S; 252/301.4 R
[58] Field of Search .................... 252/301.4 R, 302.4 S

[56] References Cited

U.S. PATENT DOCUMENTS 4,705,952 11/1987 Lindmayer ........................ 250/484.1

OTHER PUBLICATIONS

Primak et al., "J. Am. Chem. Soc.", vol. 69, 1947 pp. 1283–1287.
Patent Abstracts of Japan, vol. 5, No. 137 (E-72) (809), Aug. 29, 1981, See Abstract & JP, A, 5673847 (Nichia Kagaku Kogyo K.K.) Jun. 18, 1981.

*Primary Examiner*—Jack Cooper
*Attorney, Agent, or Firm*—Oblon, Spivak, McClelland, Maier & Neustadt

[57] ABSTRACT

A luminescent phosphor composition composed essentially of particles formed by fusion of a phosphor and a sulfate of alkaline earth metal.

4 Claims, 8 Drawing Sheets

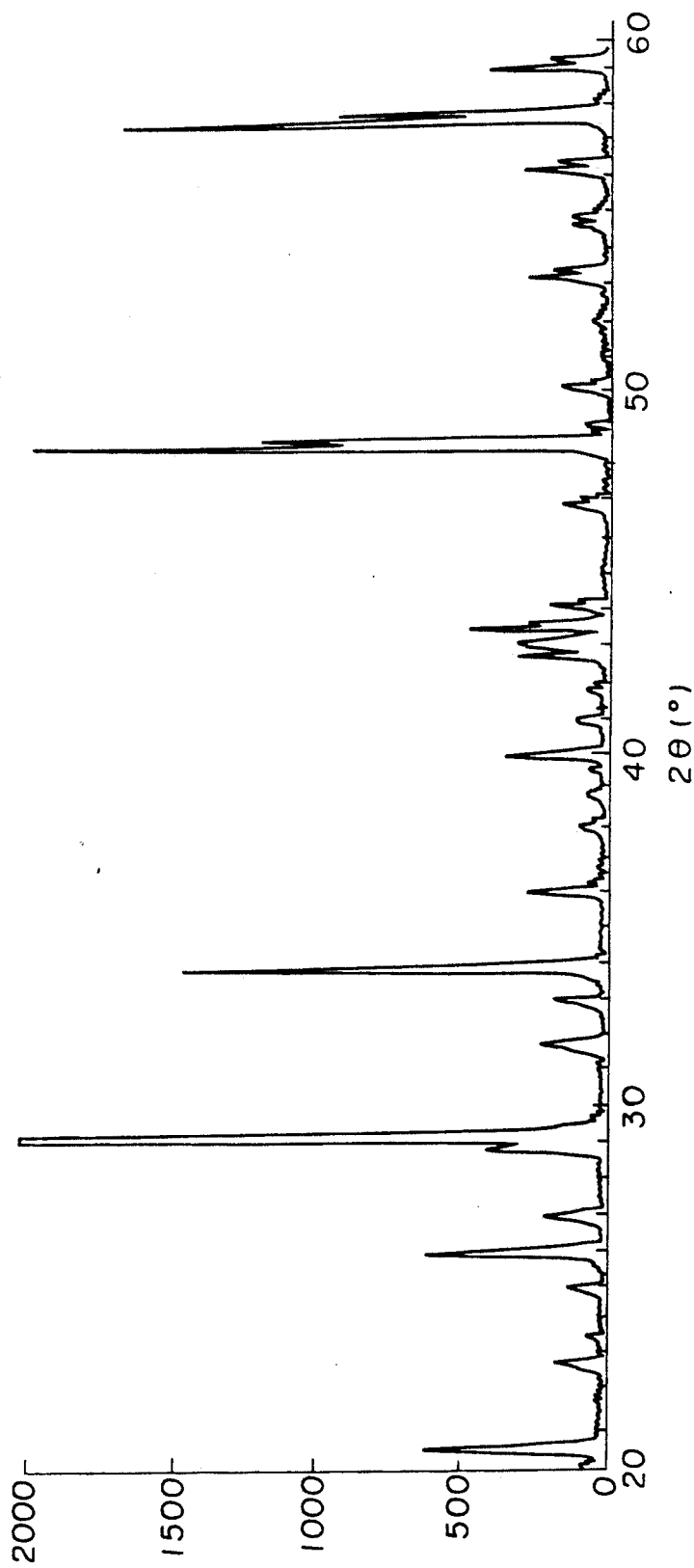
FIGURE 6-a

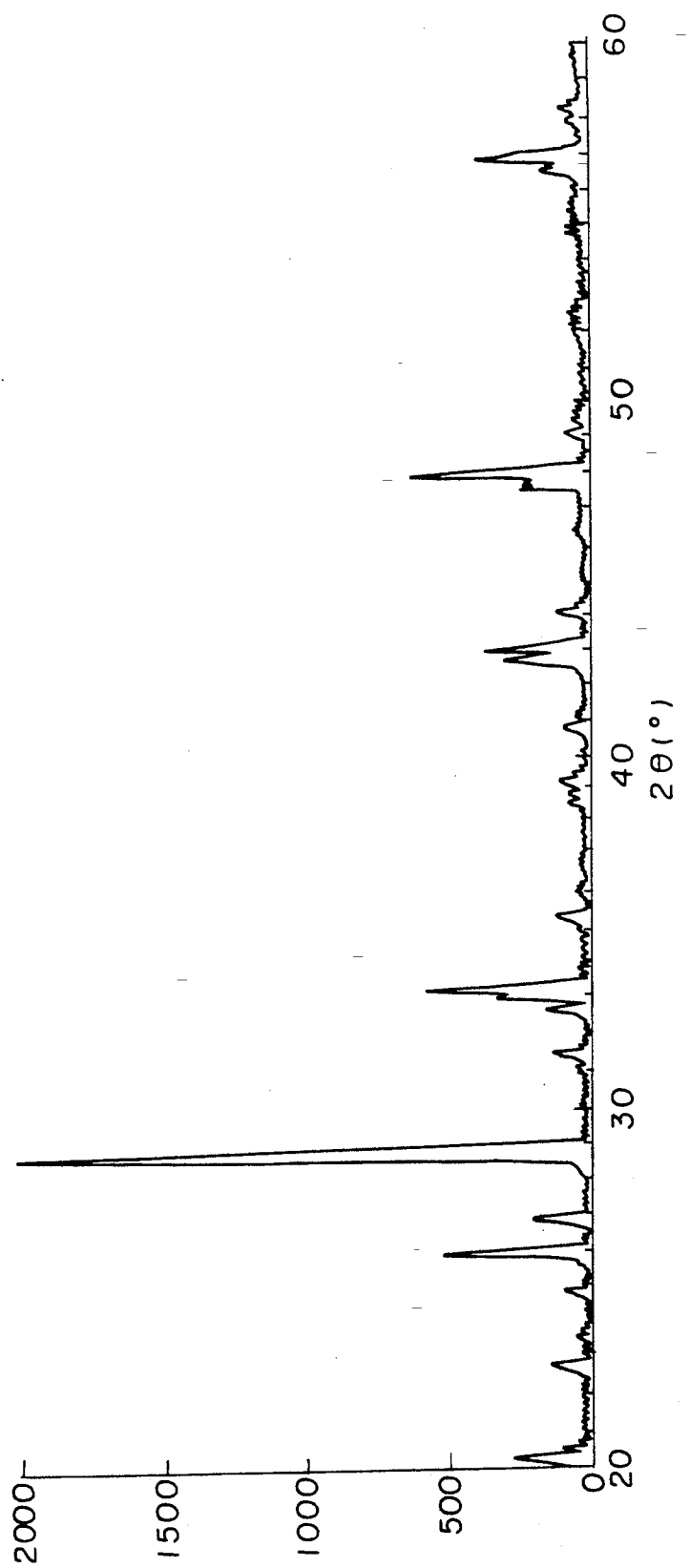
FIGURE 6-b

LUMINESCENT PHOSPHOR COMPOSITION

This application is a continuation of application Ser. No. 07/079,900 filed on Jul. 13, 1987, now abandoned.

TECHNICAL FIELD

The present invention relates to a luminescent phosphor composition, a process for its preparation and a fluorescent lamp employing it. More particularly, the present invention relates to a luminescent phosphor composition composed of a phosphor and a sulfate of alkaline earth metal, which maintains an extremely high level of luminance in spite of a large content of such a non-luminescent material and which is very inexpensive, a process for its preparation and a fluorescent lamp wherein such a luminescent phosphor composition is used as a fluorescent layer.

BACKGROUND ART

Phosphors are usually expensive as compared with ordinary chemical materials, since they have a special property to convert invisible radiant energy to a visible light. In recent years, substantial amounts of rare earth elements or noble metal elements have been used as raw materials to satisfy various properties. There have been various restrictions in their use attributable to the costs, and there has been a difficulty that the most suitable phosphor for a particular purpose is not always available because of such restrictions. Therefore, a reduction of the costs for such phosphors is strongly desired.

On the other hand, as a technique for this purpose, which is close to the present invention, it is disclosed, for example, in U.K. Patent No. 603,326 that in a fluorescent lamp, the amount of a phosphor material can be substantially reduced by providing a layer of a substance having excellent ultraviolet reflectance between the support and the phosphor. Further, as an improvement of this technique, U.S. Pat. No. 4,069,441 discloses an electric gas discharge lamp wherein a layer consisting of a mixture of a phosphor and a white material having a small absorption for ultraviolet rays, such as barium sulfate, calcium pyrophosphate or magnesium oxide, is provided on a glass tube, and a layer consisting solely of a phosphor is laminated thereon, and the layer consisting of the mixture is formed so that the ratio of the amount of the white material to the amount of the phosphor increases towards the glass tube. A related technique is also disclosed in Japanese Unexamined Patent Publication No. 128452/1982. Mixtures obtained by simply mixing phosphors with white pigments depending upon the particular specific applications (such as for X-ray image conversion screens) are disclosed in e.g. U.S. Pat. No. 4,039,840, Japanese Examined Patent Publication No. 5478/1981 and Japanese Unexamined Patent Publication No. 146447/1980. Furthermore, alkaline earth metal sulfate phosphors (i.e. phosphors wherein alkaline earth metal sulfates are used as host materials) are also known, for example, from Japanese Examined Patent Publications No. 37069/1979 and No. 50832/1982. These phosphors contain lead or bivalent europium as activator, and emit ultraviolet or blue colors under excitation with radiant energy.

The above-mentioned mixture of the phosphor and the white material has a difficulty such that the decrease in the luminance is substantially large from the practical point of view, and in order to minimize this decrease or in order to provide other effects, cumbersome means such as the formation of the special layer structure as shown in the above publications,, is required. In many cases, the amount of the use of the mixture is restricted to a level of not higher than a few percent by weight.

As mentioned above, none of the conventional techniques is capable of substantially reducing the costs for such luminescent phosphor materials without no substantial reduction of the luminance of the luminescent phosphor materials.

DISCLOSURE OF INVENTION

It is an object of the present invention to provide a luminescent phosphor material which is capable of substantially reducing the costs for the luminescent phosphor material without substantial reduction of the luminance under excitation with radiant energy, although it may happen to improve the luminance surprisingly.

The present inventors have conducted various researches on the combination of inexpensive non-luminescent materials and expensive phosphors to attain the above object, and as a result, have found it possible to obtain a luminescent phosphor material satisfying the above object by mixing a phosphor with a sulfate of alkaline earth metal, followed by sintering. The present invention has been accomplished on the basis of this discovery.

The present invention provides a luminescent phosphor composition composed essentially of particles formed by fusion of a phosphor and a sulfate of alkaline earth metal.

The present invention also provides a process for producing a luminescent phosphor composition, which comprises sintering a phosphor or a phosphor raw material and a sulfate of alkaline earth metal in their coexistent state.

Further, the present invention provides a fluorescent lamp having a fluorescent layer which contains a luminescent phosphor composition composed essentially of particles formed by fusion of a phosphor and a sulfate of alkaline earth metal.

BRIEF DESCRIPTION OF THE DRAWINGS

FIGS. 4-b and 4-c are electron microscopic photographs each illustrating the particle structure of a luminescent phosphor composition of the present invention.

Figure 5A:
Figure 5B:
Figure 5C:

Likewise, FIGS. 5-a, 5-b and 5-c are electron microscopic photographs each illustrating the particle structure of a luminescent phosphor composition of the present invention.

FIGS. 6-a and 6-b are X-ray diffraction spectra of luminescent phosphor compositions of the present invention.

DETAILED DESCRIPTION OF THE INVENTION

Now, the present invention will be described in detail.

The luminescent phosphor composition of the present invention may be prepared, for example, by the following process (hereinafter referred to as process 1).

Firstly, a phosphor and a sulfate of alkaline earth metal are thoroughly mixed, and then the mixture is sintered at a temperature within a range of from 550° to 1600° C.

The phosphor to be used in the present invention may be any one of conventional phosphors, but from the viewpoint of the sintering atmosphere, etc., an oxide-type phosphor containing oxygen as a matrix element, such as an oxide, an oxysulfide, a vanadate, a silicate, a phosphate, an aluminate or a borate, is practically most conveniently used. Namely, such an oxide phosphor is suitable as a phosphor to be sintered in an oxygen atmosphere, in a neutral atmosphere or in a weakly reducing atmosphere. From the practical point of view, the present invention is effectively applied to a phosphor which contains at least one of rare earth elements and noble metal elements with a view to effective reduction of the costs for material, and the effectiveness is remarkable particularly when applied to phosphors containing greater amounts of these elements For instance, when the present invention is applied to rare earth oxide phosphors containing europium as activator (i.e. $Ln_2O_3$:Eu phosphors wherein Ln is at least one of Y, Gd, La and Lu) as the most expensive oxide phosphors among various phosphors used in large amounts for lamps, the effectiveness is particularly remarkable.

The sulfate of alkaline earth metal in the present invention is a sulfate of at least one element selected from the group consisting of barium (Ba), strontium (Sr), calcium (Ca) and magnesium (Mg). Representative examples include barium sulfate ($BaSO_4$), strontium sulfate ($SrSO_4$) and calcium sulfate ($CaSO_4$). These alkaline earth metal sulfates are usually subjected to sieving prior to mixing with the phosphor, to disintegrate agglomerates and obtain small particles, which will then be used. The mixing of the two components is thoroughly conducted in a mortar or mill in either a dry system or a wet system.

The mixture is put in a heat resistant container and sintered at the above-mentioned temperature. This sintering is conducted usually at a temperature lower than the melting point of the phosphor and the alkaline earth metal sulfate to be used. The sintering time is usually within a range of from a few ten minutes to several hours. The atmosphere for this sintering may be a sintering atmosphere commonly employed for the preparation of ordinary phosphors. Among then, it is preferred to select a condition under which the alkaline earth metal sulfate hardly undergoes a change. The sintering temperature is preferably within a range of from 800° to 1550° C. It is advisable to add a fluxing agent when the above raw materials are mixed. It is particularly preferred to add a compound containing at least one of barium, phosphorus and boron. By the incorporation of such a fluxing agent, it is possible to obtain a luminescent phosphor composition having excellent luminance and good granularity.

According to the above process, the phosphor raw material and the alkaline earth metal sulfate are simply mixed in a dry or wet system, followed by sintering to obtain a fused product. However, the alkaline earth metal sulfate is usually agglomerated in the form of large particles having a size of at least 10 μm although the primary particle size is about 1 μm, and it is very difficult to completely disintegrate such agglomerates. If it is mixed and sintered with the phosphor and the flux in such an agglomerated state, coarse fused particles will be formed. If the amount of the flux is reduced or the sintering temperature condition is moderated to prevent this, there will be an increase of fine indivisual particles of the alkaline earth metal sufate which are not fused with the phosphor. Either case is undesirable from the viewpoint of the emission properties and layer-forming properties.

Another process whereby luminescent phosphor compositions of the present invention can be produced to have proper particle sizes with a narrow particle size distribution, is as follows (hereinafter referred to as process 2).

Namely, a solution of oxalic acid or a water-soluble oxalate and a solution of sulfuric acid or a water soluble sulfate are added together or separately to an aqueous solution containing both a compound containing at least one metal element for constituting a phosphor matrix and an alkaline earth metal salt, to form precipitates of the oxalate of the metal element for constituting the phosphor matrix and the sulfate of the alkaline earth metal, and the precipitates are used as the main component for a phosphor raw material. The phosphor raw material is then sintered.

In many cases, rare earth material as the phosphor raw material is composed mainly of an oxide as the main starting material. However, in the preliminary treatment, it is common to add an aqueous oxalic acid solution to an aqueous solution of a water-soluble rare earth salt (a chloride, nitrate, a sulfate, etc.) or to an aqueous solution obtained by dissolving its oxide, hydroxide or carbonate in an acid (such as hydrochloric acid, sulfuric acid or nitric acid), to precipitate a rare earth metal oxalate, which is then baked at a temperature of from 800° to 1000° C. to an oxide. This treatment is particularly preferred for a phosphor containing a small amount of a rare earth activator in a rare earth host material, such as $La_2O_3$:Ln' or $Ln_2O_2S$:Ln'.

The alkaline earth metal sulfate can readily be formed by adding sulfuric acid to an aqueous solution of a water soluble alkaline earth metal salt (such as a nitrate or halides but fluoride), or to an aqueous solution obtained by dissolving its oxide or carbonate in hydrochloric acid or nitric acid. The alkaline earth metal sulfate is extremely stable in water and hardly soluble even in an acid.

Therefore, a solution of oxalic acid or a water-soluble oxalate (such as ammonium oxalate, diethyl oxalate or an alkali metal oxalate, preferably ammonium oxalate or diethyl oxalate) and a solution of sulfuric acid or a water-soluble sulfate (such as ammonium sulfate or an alkali metal sulfate, preferably ammonium sulfate) are added together or separately to a solution containing a water-soluble rare earth salt containing a rare earth element for constituting a matrix metal element for the phosphor, to form precipitates of the oxalate of the matrix metal element and the sulfate of the alkaline earth metal. For the formation of the precipitates, the solution is usually stirred. Precipitates having a desired granularity may be formed by controlling the stirring condition, the concentration of the solution or the rate of adding oxalic acid or sulfuric acid.

According to this process, by forming the precipitates of the matrix metal element of the phosphor and the precipitates of the alkaline earth metal sulfate by co-precipitation or by successive precipitation, it is possible to obtain precipitates wherein the respective components are well dispersed, whereby a luminescent phosphor composition having a desired granularity characteristic and an adequate luminance characteristic will be constantly obtained.

The precipitates thus obtained, are put in e.g. a heat resistant container and sintered, to fuse the phosphor and the alkaline earth metal sulfate. This sintering can be conducted in the same manner as the above-mentioned sintering.

According to another process of the present invention, a phosphor or a phorphor raw material being a solid solution of an activator in at least one of host materials and a sulfate of alkaline earth metal, are mixed in such a manner that the sulfate of alkaline earth metal is dispersed in a solvent and in that state, deposited on the phosphor or on the phosphor raw material to form a composite material, which is then dried and sintered at a temperature within a range of from 550° to 1600° C. (hereinafter referred to as process 3).

More specifically, the sulfate of alkaline earth metal is dispersed in a solvent before it is mixed with the phosphor or the phosphor raw material. The dispersion may be conducted simply by stirring the sulfate in a solvent. However, it is preferred to preliminarily disperse it mechanically by a ballmill or the like, or to facilitate the dispersion in the solvent by a supersonic wave. As the solvent, it is common to employ water. However, in the case where the phosphor or the phosphor raw material is an oxide having poor water resistance, an organic solvent such as methanol, ethanol or isopropyl alcohol, may be employed. The sulfate of alkaline earth metal dispersed in the solvent, is then thoroughly mixed with the phosphor or the phosphor raw material. The mixing is conducted usually under stirring.

In such a manner, the sulfate of alkaline earth metal and the phosphor or the phosphor raw material undergo physical adsorption in the solvent depending upon the combination, whereby the sulfate of alkaline earth metal is uniformly deposited on the particles of the phosphor or the phosphor raw material to form a kind of a composite material. In some cases, no physical adsorption takes place, and in such a case, a small amount of an organic binder is preferably employed to improve the adhesion. As such an organic binder, an acrylic resin, a polyvinyl acetate resin, a polyvinyl butyral resin, a synthetic rubber latex, a polyvinyl pyrrolidone, a polyvinyl alcohol or gelatin is effective.

The composite material thus obtained is subjected to drying treatment, and then sintered in e.g. a heat resistant container. This sintering can be conducted in the same manner as in the above-mentioned sintering.

In the process of the present invention, it is possible to employ, instead of the sulfate of alkaline earth metal, a precursor which is capable of being converted to a sulfate of alkaline earth metal. The sulfate of alkaline earth metal for the purpose of the present invention includes such a precursor. As such a precursor, there may be mentioned a combination of an inorganic salt such as a carbonate or nitrate or an organic salt such as an acetate citrate or oxalate, of alkaline earth metal, and a sulfate such as ammonium sulfate.

Further, typical examples for the relation between the sintering condition and the luminance of luminescent phosphor compositions are shown below.

Figure 3:
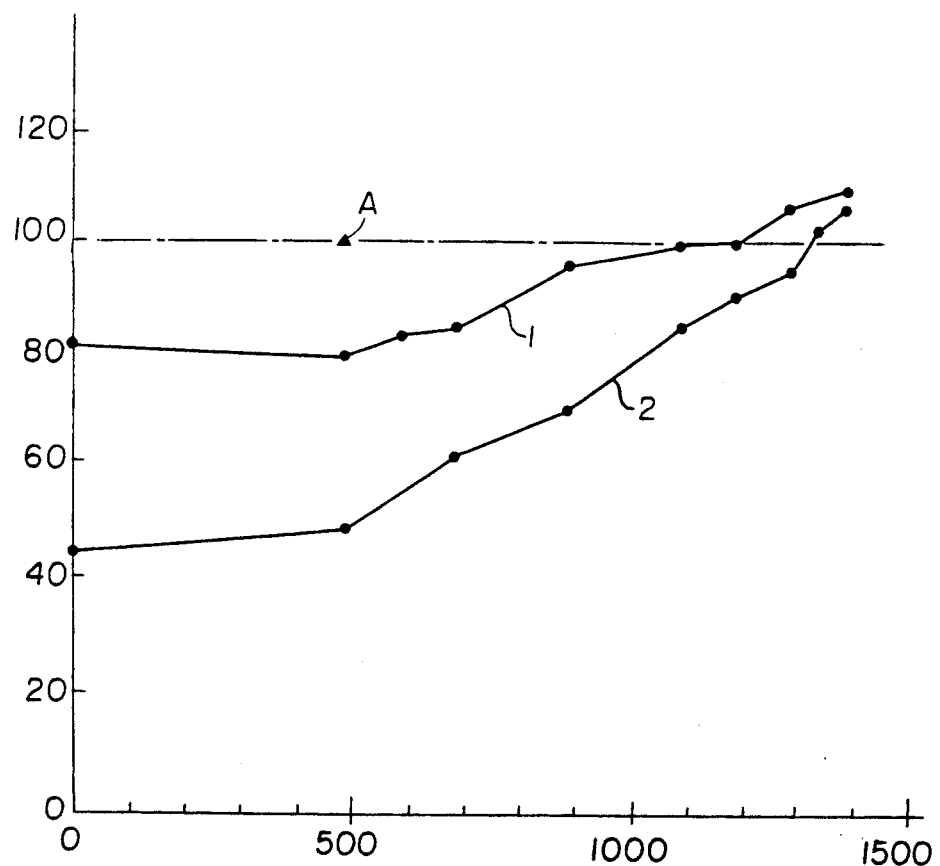
FIG. 3 is a graph showing the relation between the sintering temperature (°C.) during the preparation of a luminescent phosphor composition of the present invention and the relative luminance (%).

FIG. 3 is a graph showing the relation between the sintering temperature (°C.) for the preparation of the luminescent phosphor compositions of the present invention and the relative luminance (%) under excitation with ultraviolet rays having a wavelength of 253.7 nm. In FIG. 3, point A represents a $Y_2O_3$:Eu phosphor (relative luminance of this phosphor is evaluated to be 100%), curve 1 represents a case wherein a mixture as the starting material obtained by mechanically mixing 50 parts by weight of a $Y_2O_3$:Eu phosphor and 50 parts by weight of $BaSO_4$, is sintered, and curve 2 represents a case wherein a mixture as the starting material obtained by mixing 50 parts by weight of an Eu-containing $Y_2O_3$ as a raw material for a $Y_2O_3$:Eu phosphor and 50 parts by weight of $BaSO_4$, was sintered. As is evident from curve 1, when the phosphor and the alkaline earth metal sulfate are sintered, the luminance improves as the fusion of the two components gradually proceeds. No such a phenomenon is observed at a temperature of lower than 500° C. When the sintering temperature reaches 800° C. or higher, the luminance sharply increases by at least 20% over the luminance of the starting mixture, and the luminance approaches or even exceeds the level of the luminance of the phosphor itself Likewise, from curve 2, it is evident that when the phosphor raw material and the alkaline earth metal sulfate are sintered, the phosphor raw material is converted to a phosphor, and simultaneously, fusion with the alkaline earth metal sulfate gradually proceeds. If there were no change between the two components, no improvement in the relative luminance should be observed over the luminance at the temperature of less than 500° C. in curve 1. According to the present invention, the luminance improves over this level. Thus, in the present invention, the sintering temperature is usually at least 550° C., preferably at least 800° C., more preferably at least 1000° C. From the viewpoint of the heat efficiency, the upper limit for the sintering is usually 1600° C., preferably 1550° C., by an ordinary sintering method, although the sintering temperature may vary depending on the sintering time.

The luminescent phosphor composition can be obtained as described above. The luminescent phosphor composition of the present invention exhibits an extremely high luminance as compared with a mere mixture of a phosphor and an alkaline earth metal sulfate, or as compared with a luminescent phosphor composition obtained in the same manner as described above by using a phosphor and a material other than the alkaline earth metal sulfate.

Figure 1:
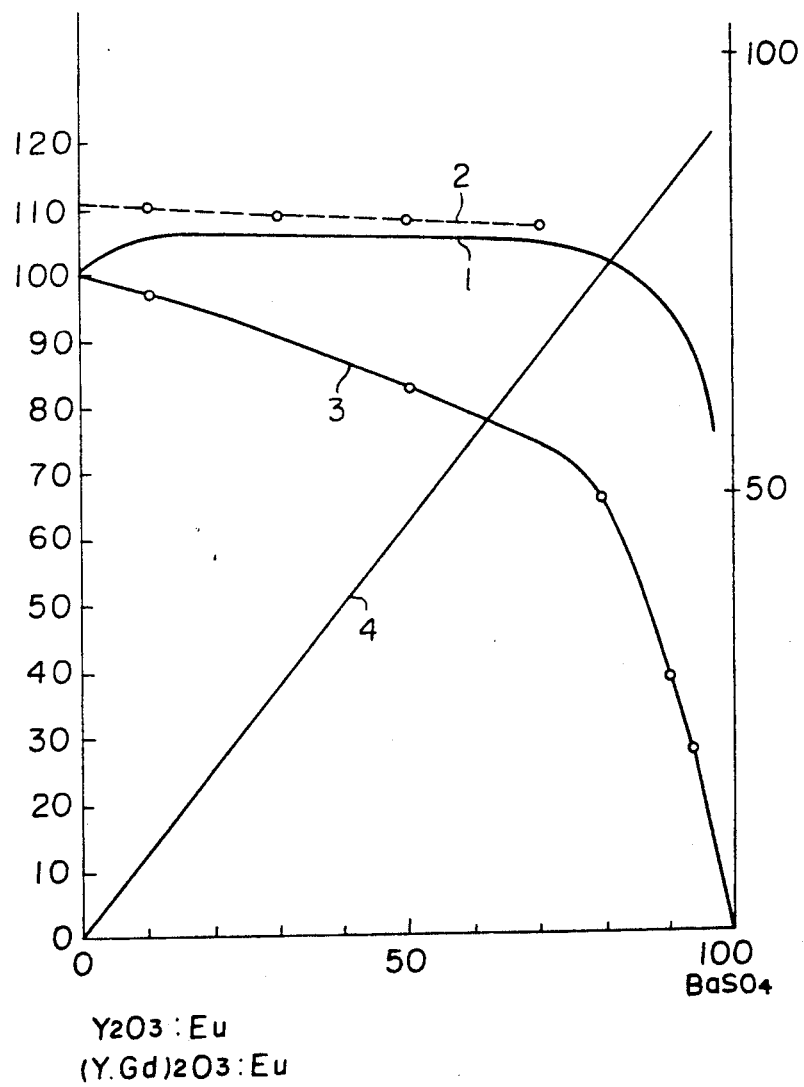
FIG. 1 is a graph showing the relation between the relative luminance under excitation with ultraviolet rays and the reduction in the costs of material, when the proportions of the phosphor and the alkaline earth metal sulfate were varied, wherein curves 1 and 2 represent luminescent phosphor compositions of the present invention, and curve 3 represents a mixture according to a conventional technique.
Figure 2:
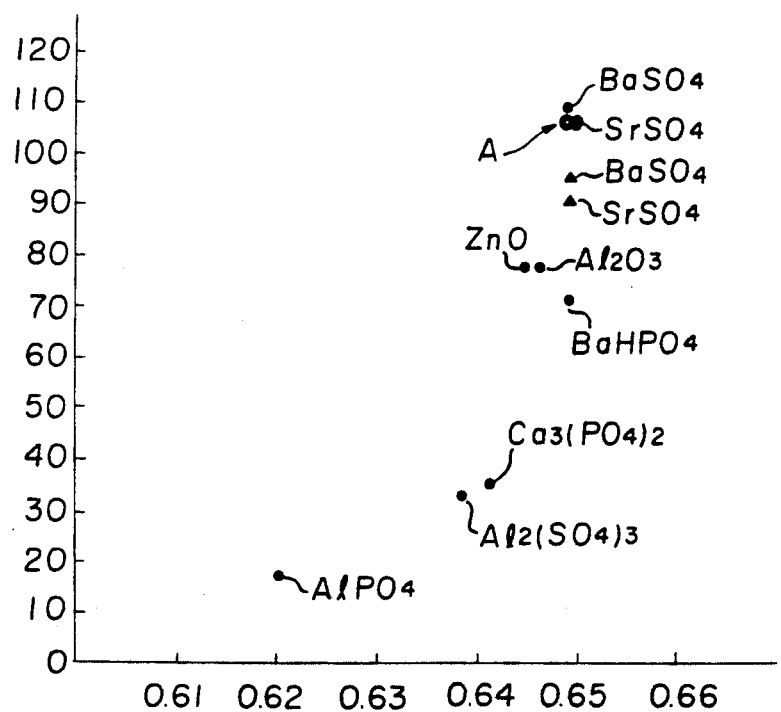
FIG. 2 is a graph showing the relation between the emitted color (x-value) and the relative luminance with respect to a phosphor, a luminescent phosphor composition of the present invention and a luminescent phosphor composition or mixture other than the present invention, under excitation with ultraviolet rays.

FIG. 2 shows the relation between the emitted color (x-value in the CIE chromaticity coordinates) and the relative luminance (%) with respect to a $(Y.Gd)_2O_3$:Eu phosphor, a mere mixture of this phosphor with an alkaline earth metal sulfate and a luminescent phosphor composition obtained from the mixture, under excitation with ultraviolet rays of 253.7 nm. In FIG. 2, point A represents the emitted color and the relative luminance of the $(Y.Gd)_2O_3$:Eu phosphor, other black circles (●) indicate the respective values in the cases where 50 parts by weight of this phosphor was mixed with 50 parts by weight of the respective materials as identified in the Figure, followed by sintering at about 1200° C. for 4 hours. Further, the black triangles (▲) in the Figure indicate the respective values of mere mixtures obtained by mechanically mixing 50% by weight of the above phosphor with 50% by weight of the respective materials identified in the Figure. As is evident from FIG. 2, the luminescent phosphor composition of the present invention composed of the above phosphor and $BaSO_4$ or $SrSO_4$, show no substantial difference in the emitted color and relative luminance from point A for the 100% phosphor despite they contain a non-luminescent material in such a large amount as 50% by weight Whereas the luminescent phosphor compositions outside the present invention, wherein ZnO, $Al_2O$, $BaHPO_4$, $Ca_3(PO_4)_2$, $Al_2(SO_4)_3$ and $AlPO_4$ were incorporated, respectively, were inferior in that the relative luminance was lower by from 20 to 80%, or a substantial change was observed in the emitted color, whereby the object of the present invention was not attained, and the effect of the present invention was not obtained. Further, the mere mixture of the phosphor with $BaSO_4$ or $SrSO_4$, as indicated by the black triangle (▲) had a luminance lower by about 20% than the point A or the luminance of the luminescent phosphor composition of the invention, since such a mixture contained a non-luminescent material in a large amount. The luminance of such a mixture certainly shows the effect as disclosed in U.S. Pat. No. 4,069,441, but the decrease in the luminance as much as 20% makes the mixture practically useless FIG. 1 shows the relation between the relative luminance (%) under excitation with ultraviolet rays of 253.7 nm and the reduction (%) in the costs of material when the proportions (% by weight) of the phosphor and the alkaline earth metal sulfate were varied in the luminescent phosphor compositions of the present invention.

In FIG. 1, curve 1 represents a luminescent phosphor composition of the present invention composed of a $Y_2O_3$:Eu phosphor and $BaSO_4$, curve 2 represents a luminescent phosphor composition of the present invention composed of a $(Y,Gd)_2O_3$:Eu phosphor and $BaSO_4$, and curve 3 represents a conventional mixture obtained by mechanically mixing a $Y_2O_3$:Eu phosphor and $BaSO_4$. These curves show the respective relative luminance characteristics. Curve 4 shows the relation between the composition of the $Y_2O_3$:Eu phosphor and $BaSO_4$ and the reduction (%) in the costs of material As is evident from FIG. 1, the luminescent phosphor compositions of the present invention represented by curves 1 and 2 show a high luminance, for instance, higher by at least 20% at the alkaline earth metal content of 50% by weight, or by at least 30% at the alkaline earth metal content of 80% by weight, than the conventional mixture represented by curve 3. Besides, at an alkaline earth metal content of not higher than 80% by weight, a surprising effect was obtained in that the luminance was substantially equal or even higher by about 7% as compared with the luminance of the phosphor itself containing no non-luminescent material. Further, the reduction in the costs of material in such a case can be as high as 76% at the maximum.

Thus, from the viewpoint of the luminance, the reduction in the costs of material, etc., the luminescent phosphor composition of the present invention has an alkaline earth metal sulfate content of preferably from 5 to 95% by weight, more preferably from 10 to 95% by weight, and for the practical purpose, a range of from 25 to 90% by weight is recommended.

The sulfate of alkaline earth metal used in the present invention is preferably a sulfate of barium, strontium or calcium. From the viewpoint of the above-mentioned effect, the specific gravity and the thermal stability, it is practically preferred to employ a sulfate of alkaline earth metal wherein the alkaline earth metal is, or is composed essentially of, at least one of barium and strontium. In this case, the sintering temperature is preferably from 800° to 1550° C., more preferably from 1000° to 1500° C.

In the foregoing, the effects of the present invention have been described with respect to the luminescent phosphor compositions excited with ultraviolet rays. However, similar effects are obtainable under excitation with electron beams. This indicates that in the present invention, the alkaline earth metal sulfate such as $BaSO_2$ is used not merely for the ultraviolet reflecting effect as in the conventional technique.

Figure 4A:
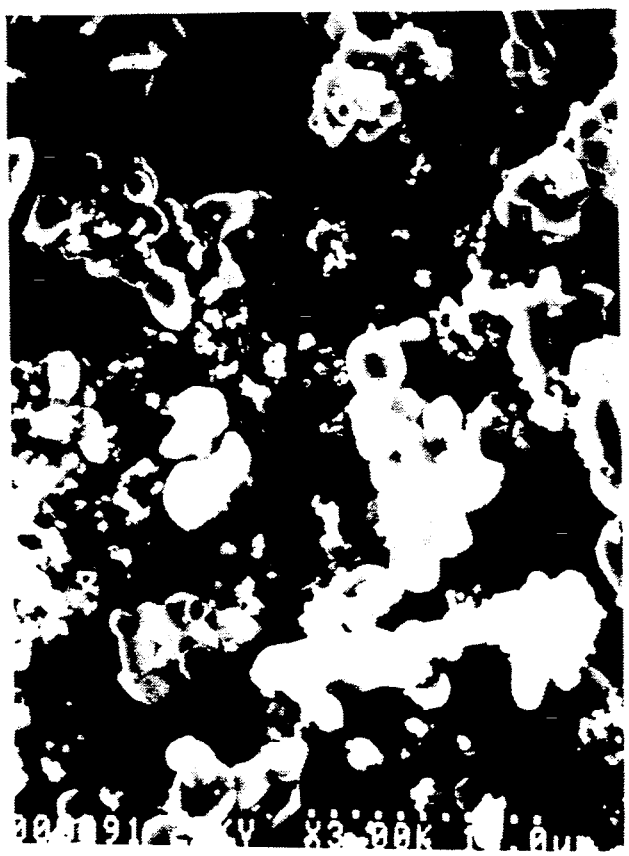
FIG. 4-a is an electron microscopic photograph illustrating the particle structure of a mixture.
Figure 4B:
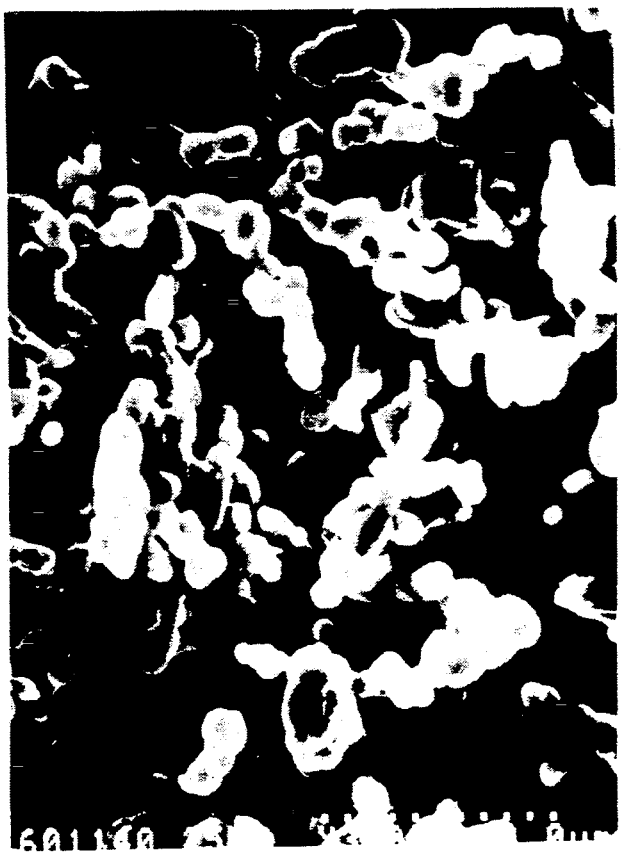
Figure 4C:

It is not clearly understood why the luminescent phosphor compositions of the present invention provide such surprising effects. FIG. 4-a shows an electron microscopic photograph (3000 magnifications) of a mixture obtained by mixing 50% by weight of a $Y_2O_3$:Eu phosphor and 50% by weight of $BaSO_4$ particles, and FIG. 4-b shows a similar electron microscopic photograph of a luminescent phosphor composition of the present invention obtained by sintering the mixture. Further, FIG. 4-c shows an electron microscopic photograph (3000 magnifications) of a luminescent phosphor composition of the present invention obtained by sintering a mixture prepared by mixing 50% by weight of a $(Y.Gd)_2O_3$:Eu phosphor and $BaSO_4$ particles. (The samples in FIGS. 4-a, 4-b and 4-c were measured after deposition of carbon.) FIGS. 5-a and 5-b show electron microscopic photographs of the luminescent phosphor compositions of the present invention obtained by sintering, under different conditions, a mixture comprising 50% by weight of a $Y_2O_3$:Eu phosphor and 50% by weight of $BaSO_4$ particles. FIG. 5-c shows an electron microscopic photograph (30000 magnifications) of a luminescent phosphor composition of the present invention obtained by sintering a co-precipitated product obtained by co-precipitating 50% by weight of the raw material for a $Y_2O_3$:Eu phosphor and 50% by weight of $BaSO_4$ (Samples in FIGS. 5-a, 5-b and 5-c were measured after deposition of gold.)

Referring to FIGS. 5-a and 5-b, from the analysis by an X-ray microanalyzer, the fine particles fused on a large particle were found to be the $Y_2O_3$:Eu phosphor, and the large particle on which the fine phosphor particles are fused, was found to be $BaSO_4$. Likewise, in FIG. 5-c, the large particle was found to be $BaSO_4$, and the crystal particles fused on its surface were found to be the $Y_2O_3$:Eu phosphor.

FIG. 6-a shows an X-ray diffraction spectrum of the luminescent phosphor composition of the present invention shown in FIG. 4-b. Likewise, FIG. 6-b shows an X-ray diffraction spectrum of the luminescent phosphor composition of the present invention shown in FIG. 4-c. These electron microscopic photographs and X-ray diffraction spectra indicate that the luminescent phosphor compositions of the present invention are composed of particles formed by fusion of a part or majority of the phosphor and the alkaline earth metal sulfate, but the compositions do not appear to be a solid solution of the two components. From the emission spectrum, no other emission spectrum than that of the $Y_2O_3$:Eu phosphor was observed, particularly no emission spectrum in the ultraviolet region of the $BaSO_4$:Eu phosphor was detected. Thus, the luminescent phosphor composition of the present invention obtained by the above-mentioned process, is represented by the formula $(Ln,Eu)_2O_3 \cdot xM^{II}SO_4$ (wherein Ln is at least one of Y, Gd, La and Lu, $M^{II}$ is an alkaline earth metal, and x is a positive number showing the proportion). From these facts, the particles formed by fusion of a phosphor and a sulfate of alkaline earth metal in the present invention include, not only those obtained by sintering the two components at a temperature of at least 550° C., preferably at least 800° C., wherein the boundaries of the two components are not distinct as shown in FIG. 4-b, but also those wherein the two components are sintered to each other as shown in FIGS. 5.

In the present invention, when a trace amount of an activator element is added to the sulfate of alkaline earth metal, the luminance of the luminescent phosphor composition thereby obtained, was equal to or even higher than the composition containing no such an activator element. As representative activator elements used in a trace amount, europium (Eu), lead (Pb), terbium (Tb), Cerium (Ce and manganese (Mn) are recommended. Particularly preferred from the viewpoint of the above-mentioned effects, the activator element is preferably at least one of europium and lead.

As mentioned in the foregoing, the luminescent phosphor composition of the present invention is capable of providing an emission having an extremely high luminance under excitation with ultraviolet rays. Accordingly, by using this luminescent phosphor composition, it is possible to produce an extremely useful fluorescent lamp in accordance with a conventional method. In particular, with the luminescent phosphor composition of the present invention, it is possible to remarkably reduce the costs for the phosphor having a high luminance and containing a rare earth element or a noble metal element, and it is recommended to use the luminescent phosphor composition of the present invention for the high color rendering fluorescent lamp in which such a phosphor is used in a large amount.

Namely, in a preferred embodiment of the fluorescent lamp of the present invention, the fluorescent layer contains a blue-emitting material having a peak emission wavelength within a range of from 430 to 475 nm, a green-emitting material having a peak emission wavelength within a range of from 520 to 560 nm and a red-emitting material having a peak emission wavelength within a range of from 595 to 630 nm, and at least one of the above color emitting materials is made of the luminescent phosphor composition of the present invention. Representative phosphors suitable for the above blue-emitting material, include a bivalent europium-activated calcium chloroborate phosphor (such as $Ca_2B_5O_9Cl$:$Eu^{2+}$), a bivalent europium-activated alkaline earth metal aluminate phosphor (such as $BaMg_2Al_{16}O_{27}$:$Eu^{3+}$), and a bivalent europium-activated alkaline earth metal halophosphate phosphor ($aM^{II}_3(PO_4)_2 \cdot bM^{II}Cl_2$:$Eu^{2+}$ wherein $M^{II}$=Ca, Sr, Ba, and $1 \leq a/b \leq 3$). Representative phosphors suitable for the above green-emitting material include a cerium terbium-activated lanthanum phosphate phosphor (such as $LaPO_4$:Ce,Tb), a cerium terbium-activated alkaline earth metal borate phosphor (such as $nM^{II}O \cdot B_2O_3$:Ce,Tb, wherein $M^{II}$=Mg, Zn, and $0 < n \leq 2$, or $GdMgB_5O_{10}$:Ce,Tb), a terbium activated alkaline earth metal cerium aluminate phosphor (such as (Ce,Tb)$M^{II}Al_{11}O_{19}$=Mg, Zn), and a cerium terbium-activated rare earth silicate phosphor (such as $Ln_2SiO_5$:Ce,Tb wherein Ln=Y, Gd, La). Likewise, a typical phosphor suitable for the above red-emitting material is an europium-activated rare earth oxide phosphor (such as $Ln_2O_3$:Eu, wherein Ln=Y, Gd, La). Further, for the improvement of the color rendering property, a bluish green emitting material having a peak emission wavelength within a range of from 480 to 500 nm may be incorporated. Representative phosphors useful for such a bluish green-emitting material include a bivalent europium-activated strontium aluminate phosphor (such as $4SrO \cdot nAl_2O_3$:$Eu^{2+}$, wherein $5 \leq n \leq 8$), and a bivalent europium-activated alkaline earth metal borophosphate phosphor (such as $mM^{II}O \cdot (1-n)P_2O_5 \cdot nB_2O_3$:$Eu^{2+}$, wherein $M^{II}$=Ca, Sr, Ba, $1.75 \leq m \leq 2.30$, and $0.05 \leq n \leq 0.23$).

By using a luminescent phosphor composition of the present invention wherein at least one of the above phosphors and a sulfate of alkaline earth metal are fused, it is possible to substantially reduce the amount of the phosphor required. For this purpose, it is recommended to select an oxide-type phosphor containing a rare earth element as an element for constituting the phosphor matrix or containing a substantial amount of a rare earth element as activator, for the phosphor of the luminescent phosphor composition of the present invention. For instance, such an oxide-type phosphor includes a europium-activated rare earth oxide phosphor, and a cerium terbium-activated rare earth silicate phosphor.

The surprising effects of the luminescent phosphor composition of the present invention include not only the improvement in the luminance of the fused phosphor, but also an improvement in the luminance of other phosphors mechanically mixed but not fused with the luminescent phosphor composition of the present invention. For instance, a high color rendering fluorescent lamp of the present invention having a fluorescent layer obtained by mixing $(Ln,Eu)_2O_3 \cdot BaSO_4$ as the luminescent phosphor composition of the present invention with the above green-emitting phoshor and the above blue-emitting phosphor, requires a less amount of the $(Ln,Eu)_2O_3$ phosphor to obtain the same emitted color as the conventional high color rendering fluorescent lamp containing no $BaSO_4$, and yet requires less amounts of the green and blue-emitting phosphors. This is evidenced by a working Example given hereinafter. For this reason, for the high color rendering fluorescent lamp of the present invention, it is advisable to select a suitable phosphor which can be combined most stably or readily with an alkaline earth metal sulfate to form a luminescent phosphor composition of the present invention. A typical example of such a phosphor is a red-emitting europium-activated rare earth oxide phosphor. Therefore, in the following Examples, fluorescent lamps wherein this phosphor is employed for the luminescent phosphor composition of the present invention, are described. However, the present invention is by no means restricted to such specific Examples.

EXAMPLE 1

Oxalate precipitates were prepared by using 76 parts by weight of gadolinium oxide ($Gd_2O_3$), 20 parts by weight of yttrium oxide ($Y_2O_3$) and 4 parts by weight of europium oxide ($Eu_2O_3$), and the precipitates were baked at 1000° C. for 3 hours to obtain an oxide represented by the formula $(Gd,Y,Eu)_2O_3$. Then, 50 parts by weight of this $(Gd,Y,Eu)_2O_3$ and 50 parts by weight of barium sulfate ($BaSO_4$, guaranteed reagent) were mixed, and a fluxing agent (1% by weight of $BaCl_2.2H_2O$ and 0.1% by weight of $H_3BO_3$). The mixture was thoroughly mixed, and then filled in a cruicible and sintered at 1200° C. for 4 hours. Then, the sintered product was washed and dried to obtain a luminescent phosphor composition of the present invention $(Y,Gd,Eu)_2O_3.BaSO_4$. [FIG. 4-c shows an electron microscopic photograph (3000 magnifications), and FIG. 6-b shows the X-ray diffraction spectrum.] On the other hand, the above oxide $(Gd,Y,Eu)_2O_3$ alone was sintered and treated under the same conditions to obtain a phosphor, which was used as a standard product The above luminescent phosphor composition and this standard product were respectively filled in quartz cells, and irradiated with ultraviolet rays of 253.7 nm to measure the luminance and the emitted colors (The measurements will sometimes be referred to hereinafter as ultraviolet measurements.) There was no difference between the two in the luminance and the emitted color (x/y=0.650/0.346). The properties obtained by varying the proportions of the phosphor and $BaSO_4$ in the same manner of production, are shown by curve 2 in FIG. 1.

as the price for $(Y,Eu)_2O_3$ and 2,000 yen/kg as the price for $BaSO_4$.

TABLE 1

| No. | | Proportions in luminescent phosphor composition (wt %) | | Relative luminance (%) | Reduction in the cost of material | |
|---|---|---|---|---|---|---|
| | | $(Y, Eu)_2O_3$ | $BaSO_4$ | | Amount (yen/kg) | Rate (%) |
| (1) | Standard product | 100 | 0 | 100 | 0 | 0 |
| (2) | Present invention | 90 | 10 | 106 | 4000 | 9.5 |
| (3) | Present invention | 50 | 50 | 106 | 20000 | 47.6 |
| (4) | Present invention | 30 | 70 | 105 | 28000 | 66.7 |
| (5) | Present invention | 20 | 80 | 103 | 32000 | 76.2 |
| (6) | Present invention | 10 | 90 | 95 | 36000 | 85.7 |
| (7) | Comparative Example | 0 | 100 | 0 | 40000 | 95.2 |

EXAMPLE 2

An oxide represented by the formula $(Y,Eu)_2O_3$ was prepared in the same manner as in Example 1 except that 95 parts by weight of yttrium oxide ($Y_2O_3$) and 5 parts by weight of europium oxide ($Eu_2O_3$) were used as raw materials. Then, to this $(Y,Eu)_2O_3$, barium sulfate ($BaSO_4$) was added in the predetermined proportions (% by weight) as identified in Table 1, and luminescent phosphor compositions of the present invention $(Y,Eu)_2O_3 \cdot xBaSO_4$ having the proportions (% by weight) corresponding to the respective mixing proportions, were obtained in the same manner as in Example 1 except that the sintering was conducted at 1400° C. for 4 hours. [FIG. 4-b shows an electron microscopic photograph (3000 magnifications) of the product of the present invention as identified by No 3 in Table 1, and FIG. 6-a shows the X-ray diffraction spectrum.]

By using the above oxide only, a standard product was prepared in the same manner as in Example 1. The relative luminance obtained from the ultraviolet measurements and the reduction in the costs of material are shown in Table 1. There was no change observed in the emitted color The reduction in the cost of material was calculated on the basis of the price at which each material is usually commercially available, i.e. 42,000 yen/kg

EXAMPLE 3

An oxide represented by the formula $(Y,Eu)_2O_3$ was prepared in the same manner as in Example 1 except that 94.6 parts by weight of yttrium oxide ($Y_2O_3$) and 5.4 parts by weight of europium oxide ($Eu_2O_3$) were used as raw materials. Then, 50 parts by weight of this $(Y,Eu)_2O_3$ and 50 parts by weight of barium sulfate ($BaSO_4$) were mixed, and then treated in the same manner as in Example 2 to obtain a luminescent phosphor composition of the present invention $(Y,Eu)_2O_3.BaSO_4$. On the other hand, the above oxide $(Y,Eu)_2O_3$ alone was sintered under the same conditions to obtain a phosphor, which was used as a standard product. The above luminescent phosphor composition and this standard product were formed into fluorescent layers, respectively and excited to measure the emitted colors and the luminance, whereby no difference was observed between the two in the emitted color (x/y=0.641/0.353) and the luminance.

Whereas 50 parts by weight of the above standard product $(Y,Eu)_2O_3$ phosphor and 50 parts by weight of barium sulfate ($BaSO_4$) were thoroughly mixed, and the mixture was subjected to the measurements under the same conditions, whereby no change was observed in the emitted color, but the luminance decreased substantially.

EXAMPLE 4

A fluxing agent was added to 50 parts by weight of the $(Y,Eu)_2O_3$ oxide shown in Example 2 and 50 parts by weight of strontium sulfate ($SrSO_4$), and the mixture was thoroughly mixed, then filled in a cruicible, sintered at 1350° C. for 4 hours, then washed and dried to obtain a luminescent phosphor composition of the present invention $(Y,Eu)_2O_3.SrSO_4$. This luminescent phosphor composition and the standard $(Y,Eu)_2O_3$ phosphor of Example 2 were subjected to ultraviolet measurements, whereby no difference was observed between the two in the luminance and the emitted colors.

EXAMPLE 5

70 Parts by weight of a terbium-activated yttrium aluminate phosphor ($Y_3Al_5O_{12}:Tb$) and 30 parts by weight of barium sulfate ($BaSO_4$) were mixed, and a fluxing agent (1 part by weight of $BaCl_2.2H_2O$ and 0.1 part by weight of $H_3BO_3$) was added thereto. The mixture was thoroughly mixed, then sintered at 1200° C. for 2 hours, thereafter washed and dried to obtain a luminescent phosphor composition of the present invention. This composition showed a luminance under excitation with ultraviolet rays of 253.7 nm, at a level of 83% relative to 100% by the $Y_3Al_5O_{12}$:Tb phosphor. The luminance of the mere mixture before the sintering, was 62%.

EXAMPLE 6

70 Parts by weight of a europium-activated yttrium oxysulfide ($Y_2O_2S$:Eu) and 30 parts by weight of barium sulfate ($BaSO_4$) were mixed, and a fluxing agent (1 part by weight of lithium phosphate) was added thereto. The mixture was treated in the same manner as in Example 5 to obtain a luminescent phosphor composition of the present invention. This luminescent phosphor composition showed a luminance under excitation with ultraviolet rays of 253.7 nm, at a level of 101% relative to 100% by the $Y_2O_2S$:Eu phosphor. The luminance of the mere mixture before sintering was 67%.

EXAMPLE 7

70 Parts by weight of a terbium-activated yttrium silicate phosphor ($Y_2SiO_5$:Tb) and 30 parts by weight of barium sulfate ($BaSO_4$) were mixed, and a fluxing agent (1 part by weight of $Li_2B_4O_7$) was added thereto. The mixture was thoroughly mixed, then sintered at 1300° C. for 2 hours, thereafter washed and dried to obtain a luminescent phosphor composition of the present invention. This luminescent phosphor composition showed a luminance under excitation of ultraviolet rays of 253.7 nm at a level of 110% relative to 100% by the $Y_2SiO_5$:Tb phosphor. The luminance of the mere mixture before sintering was 60%.

EXAMPLE 8

50 Parts by weight of a terbium-activated gadolinium oxysulfide ($Gd_2O_2S$:Tb) and 50 parts by weight of barium sulfate ($BaSO_4$) were mixed, and the mixture was treated in the same manner as in Example 5 to obtain a luminescent phosphor composition of the present invention. This luminescent phosphor composition showed a luminance under excitation with ultraviolet rays of 253.7 nm at a level of 91% relative to 100% by the $Gd_2O_2S$:Tb phosphor The luminance of the mere mixture before sintering was 65%.

EXAMPLE 9

50 Parts by weight of a europium-activated yttrium vanadate ($YVO_4$:Eu) and 50 parts by weight of barium sulfate ($BaSO_4$) were mixed, and the mixture was treated in the same manner as in Example 5 to obtain a luminescent phosphor composition of the present invention. This luminscent phosphor composition showed a luminance under excitation of ultraviolet rays of 253.7 nm at a level of 83% relative to 100% by the $YVO_4$:Eu phosphor.

EXAMPLE 10

The following solutions A, B, C and D were prepared
Solution A: 950 g of $Y_2O_3$ and 50 g of $Eu_2O_3$ were dissolved in a required amount of hydrochloric acid, and diluted to 10 liters.

Solution B: 1000 g of $BaCl_2.2H_2O$ was dissolved in water and diluted to 5 liters.
Solution C: 600 g of oxalic acid was dissolved in 3 liters of warm water.
Solution D: 500 g of sulfuric acid was diluted to 3 liters of a dilute sulfuric acid solution Solution D was gradually added to a mixture of solutions A and B under stirring. After the completion of the addition, solution C was gradually added thereto. After the addition, stirring was continued for a sufficient time, and then the precipitated product was washed with water, then dehydrated, filled in a quartz oven container and baked in air at 1000° C. for 3 hours to obtain a raw material for sintering. To this raw material, a fluxing agent (1.0% of $BaCl_2.2H_2O$ and 0.1% of $H_3BO_3$) was added, and the mixture was thoroughly mixed, then filled in a cruicible and sintered at 1400° C. for 4 hours. The sintered product was taken out, thoroughly washed with water, then dehydrated, dried and subjected to sieving with a 150 mesh sieve to obtain a luminescent phosphor composition.

The granularities of the raw material for sintering and the luminescent phosphor composition were measured, and the results are shown in Table 2.

EXAMPLE 11

To a mixture of solutions A and B in Example 10, a mixture of solutions C and D was gradually added, and the mixture was thoroughly stirred to obtain a precipitated product, which was treated in the same manner as in Example 10 to obtain a raw material for sintering and a luminescent phosphor composition. Their granularities are shown in Table 2.

COMPARATIVE EXAMPLE 1

To solution A in Example 10, solution C was gradually added under stirring, and the mixture was treated in the same manner as in Example 10 to obtain a raw material for sintering.

50 Parts by weight of this raw material $(Y,Eu)_2O_3$ for sintering was mixed with 50 parts by weight of commercially available $BaSO_4$ (150 mesh pass) and a fluxing agent (1% by weight of $BaCl_2.2H_2O$ and 0.2% by weight of $H_3BO_3$), and the mixture was filled in a cruicible and treated under the same conditions as in Example 10 to obtain a luminescent phosphor composition. The granularities of the raw material for sintering and the fluorescent phosphor composition are shown in Table 2.

EXAMPLE 12

The precipitated product obtained in Example 10 was washed with water and dehydrated, and then a fluxing agent (0.5% by weight of $BaCl_2.2H_2O$ and 0.1% by weight of $H_3BO_3$) was added thereto. The mixture was thoroughly mixed, then sintered at 1400° C. for 4 hours in a quartz oven container, then washed with water, dried and then subjected to sieving with a 150 mesh sieve to obtain a luminescent phosphor composition. The granularities of the raw material for sintering and the luminescent phosphor composition are shown in Table 2.

TABLE 2

|  |  | Example | | | Comparative Example 1 | |
| --- | --- | --- | --- | --- | --- | --- |
|  |  | 10 | 11 | 12 | $(Y, Eu)_2O_3$ | $BaSO_4$ |
| Raw | Center particle size $d_{50}$ | 5.1 μm | 6.1 μm | — | 4.9 μm | 17.0 μm |

TABLE 2-continued

|  |  | Example | | | Comparative Example 1 | |
|---|---|---|---|---|---|---|
|  |  | 10 | 11 | 12 | (Y, Eu)$_2$O$_3$ | BaSO$_4$ |
| material for sintering | Average particle size $\bar{d}$ | 5.5 μm | 6.5 μm | — | 5.7 μm | 20.5 μm |
|  | Particle size distribution |  |  |  |  |  |
|  | −4 μm | 26% | 27% | — | 35% | 0% |
|  | 4–16 μm | 72% | 71% | — | 63% | 37% |
|  | More than 16 μm | 2% | 2% | — | 2% | 63% |
| Luminescent phosphor composition | Center particle size d$_{50}$ | 8.2 μm | 8.4 μm | 8.5 μm | 6.3 μm | |
|  | Average particle size $\bar{d}$ | 8.5 μm | 8.8 μm | 8.9 μm | 11.3 μm | |
|  | Particle size distribution |  |  |  |  |  |
|  | −5 μm | 17% | 18% | 18% | 33% | |
|  | 5–16 μm | 81% | 77% | 76% | 49% | |
|  | More than 16 μm | 2% | 5% | 6% | 18% | |

EXAMPLE 13

Barium sulfate (BaSO$_4$) was preliminarily subjected to dispersing treatment for 40 hours in a ballmill containing water and alumina balls. The slurry containing 30 parts by weight of BaSO$_4$ was poured into water, and 70 parts by weight of a co-precipitated oxide of (Y,Eu)$_2$O$_3$ was added thereto under stirring. The mixture was further stirred, and then a diluted solution of 0.5 part by weight of an acryl emulsion (HA-24, manufactured Nippon Acryl K.K.) was added thereto. A composite material thus obtained, was dehydrated, dried and subjected to sieving, and then a fluxing agent (1.0% by weight of BaCl$_2$.2H$_2$O and 0.3% by weight of H$_3$BO$_3$) was added thereto. The mixture was thoroughly mixed, then filled in a cruicible, and sintered at 1350° C. for 4 hours. The sintered composition was taken out from the cruicible, thoroughly washed with water, then dehydrated, dried and subjected to sieving with a 150 mesh sieve to obtain a luminescent phosphor composition of the present invention.

EXAMPLE 14

0.5 Part by weight of gelatin was thoroughly dissolved in warm water, and 30 parts by weight of commercially available BaSO$_4$ was added thereto. The mixture was thoroughly stirred, and 70 parts by weight a co-precipitated oxide of (Y,Eu)$_2$O$_3$ was added thereto. The mixture was further stirred, and 0.3 part by weight of a solution of gum arabic was added thereto A composite product thus obtained, was dehydrated, dried, subjected to sieving, mixed with a fluxing agent and sintered in the same manner as in Example 13 to obtain a luminescent phosphor composition of the present invention.

COMPARATIVE EXAMPLE 2

70 Parts by weight of a co-precipitated oxide of (Y,Eu)$_2$O$_3$, 30 parts by weight of commercially available BaSO$_4$ (150 mesh pass) and a fluxing agent (1% by weight of BaCl$_2$.2H$_2$O and 0.2% by weight of H$_3$BO$_3$) were mixed, and the mixture was filled in a cruicible and sintered under the same conditions as in Example 13 to obtain a luminescent phosphor composition.

The luminescent phosphor compositions of Examples 13 and 14 and Comparative Example 2 were measured for their granularities, particle sizes and luminance. The results are shown in Table 3.

TABLE 3

|  | Example 13 | Example 14 | Comparative Example 2 |
|---|---|---|---|
| Center particle size d$_{50}$ | 6.5 | 6.7 | 7.1 |

TABLE 3-continued

|  | Example 13 | Example 14 | Comparative Example 2 |
|---|---|---|---|
| Average particle size $\bar{d}$ | 7.8 | 8.4 | 12.2 |
| Particle size distribution |  |  |  |
| 0–4 μm | 14.5% | 17.7% | 18.2% |
| 4–16 μm | 80.6% | 77.7% | 59.2% |
| More than 16 μm | 4.9% | 4.6% | 22.6% |
| Luminance of powder (UV) | 102 | 101 | 100 |
| Luminance of layer | 107% | 105% | 100% |

It is evident from Table 3 that the luminescent phosphor compositions of the present invention showed excellent luminance, and have narrow particle size distributions.

EXAMPLE 15

41 Parts by weight of barium acetate and 21 parts by weight of ammonium sulfate were pulverized and mixed. Then, 38 parts by weight of a co-precipitated oxide of (Y,Eu)$_2$O$_3$ and a fluxing agent (1% by weight of BaCl$_2$.2H$_2$O and 0.3% by weight of H$_3$BO$_3$) were added thereto, and the mixture was thoroughly mixed, then filled in a cruicible and sintered under the same conditions as in Example 13 to obtain a luminescent phosphor composition of the present invention comprising a europium-activated yttrium oxide phosphor and barium sulfate.

EXAMPLE 16

A luminescent phosphor composition of the present invention comprising a europium-activated yttrium oxide phosphor and calcium sulfate, was obtained in the same manner as in Example 15 except that 27 parts by weight of calcium carbonate, 36 parts by weight of ammonium sulfate and 37 parts by weight of a co-precipitated oxide of (Y,Eu)$_2$O$_3$ were used.

EXAMPLE 17

A luminescent phosphor composition of the present invention comprising a europium-activated yttrium oxide phosphor and strontium sulfate, was obtained in the same manner as in Example 15 except that 40 parts by weight of strontium nitrate, 25 parts by weight of ammonium sulfate and 35 parts by weight of a co-precipitated oxide of (Y,Eu)$_2$O$_3$ were used.

COMPARATIVE EXAMPLE 3

A luminescent phosphor composition having the same composition as in Example 17, was obtained in the same manner as in Example 15 except that 50 parts by weight of strontium sulfate and 50 parts by weight of a co-precipitated oxide of (Y,Eu)$_2$O$_3$ were used.

The granularities and particle sizes of the luminescent phosphor compositions of Examples 15, 16 and 17 and Comparative Example 3 were measured. The results are shown in Table 4.

TABLE 4

|  | Example 15 | Example 16 | Example 17 | Comparative Example 3 |
|---|---|---|---|---|
| Center particle size $d_{50}$ | 9.9 | 10.0 | 9.2 | 8.5 |
| Particle size distribution |  |  |  |  |
| 0–5 μm | 12% | 11% | 13% | 18% |
| 5–15 μm | 68% | 71% | 75% | 56% |
| More than 15 μm | 20% | 18% | 12% | 26% |

As is evident from Table 4, the luminescent phosphor compositions of the present invention according to this process had narrow particle size distributions as compared with the Comparative Example.

EXAMPLE 18

43.5 Parts by weight of the red-emitting component of $(Y,Gd,Eu)_2O_3 \cdot BaSO_4$ (x/y=0.657/0.348) as the luminescent phosphor composition of the present invention disclosed in Example 1, 33.7 parts by weight of a green-emitting component of a $LaPO_4:Ce,Tb$ phosphor (x/y=0.359/0.574) and 22.8 parts by weight of a blue-emitting component of a $Ca_2B_5O_9Cl:Eu$ phosphor (x/y=0.134/0.094) were thoroughly mixed, and a coating solution was prepared by using this phosphor mixture, and coated on the inside wall of a glass tube so that the coated amount would be about 4 mg/cm². Then, a fluorescent lamp was prepared in accordance with a conventional method. This fluorescent lamp showed a high color rendering property with a white emission (x/y=0.354/0.374), and the luminance was 99% relative to the same fluorescent lamp (Br=100%) except that no $BaSO_4$ was employed.

EXAMPLE 19

50 Parts by weight of red-emitting component of a luminescent phosphor composition of $(Y_{0.963},Eu_{0.037})_2O_3 \cdot BaSO_4$, 35 parts by weight of a green-emitting component of a $LaPO_4:Ce,Tb$ phosphor and 15 parts by weight of a blue-emitting component of a $(Sr,Ca)_5(PO_4)_3Cl:Eu^{2+}$ phosphor were thoroughly mixed, and a coating solution was prepared by using this phosphor mixture, and coated on the inside wall of a glass tube. Then, a white emitting fluorescent lamp of 30 W was prepared. The coated amount was 4 mg/cm². This fluorescent lamp had a luminous efficacy of 71 lm/W and a color rendering index of 82.

EXAMPLE 20

A white emitting fluorescent lamp was prepared in the same manner as in Example 19 by using 50 parts by weight of a red-emitting component of a fluorescent phosphor composition $(Y_{0.1}Gd_{0.87}Eu_{0.03})_2O_3 \cdot BaSO_4$, 35 parts by weight of a green-emitting component of a $LaPO_4:Ce,Tb$ phosphor and 15 parts by weight of a blue-emitting component of a $BaMg_2Al_{16}O_{27}:Eu$ phosphor. This fluorescent lamp had luminous efficacy of 69 lm/W and a color rendering index of 83.

EXAMPLE 21

A white emitting fluorescent lamp was prepared in the same manner as in Example 19 by using 35 parts by weight of a red-emitting component of a luminescent phosphor composition $(Gd_{0.955}Eu_{0.045})_2O_3 \cdot 0.7BaSO_4$, 30 parts by weight of a green-emitting component of a $LaPO_4:Ce,Tb$ phosphor, 15 parts by weight of a blue-emitting component of a $Ca_2B_5O_9Cl:Eu^{2+}$ phosphor and 30 parts by weight of a bluish green-emitting component of a $2(Ba,Ca,Sr)O \cdot 0.9P_2O_5 \cdot 0.1B_2O_3$ phosphor. This fluorescent lamp had a luminous efficacy of 70 lm/W and a color rendering index of 82.

COMPARATIVE EXAMPLE 4

A white emitting fluorescent lamp having a conventional composition was prepared in the same manner as in Example 19 by using 37 parts by weight of a red-emitting component of a $(Y_{0.963}Eu_{0.37})_2O_3$ phosphor, 43 parts by weight of a green-emitting component of a $LaPO_4:Ce,Tb$ phosphor and 20 parts by weight of a $(Sr,Ca)_5(PO_4)_3Cl:Eu$ phosphor. This fluorescent lamp had a luminous efficacy of 70 lm/W and a color rendering index of 82.

COMPARATIVE EXAMPLE 5

25 Parts by weight of a $(Y_{0.963}Eu_{0.037})_2O_3$ phosphor, 35 parts by weight of a $LaPO_4:Ce,Tb$ phosphor, 15 parts by weight of a $(Sr,Ca)_5(PO_4)_3Cl:Eu^{2+}$ and 25 parts by weight of $BaSO_4$ (guaranteed reagent) were mixed, and a white-emitting fluorescent lamp was prepared in the same manner as in Example 19. This fluorescent lamp had a luminous efficacy of 59 lm/W and a color rendering index of 79, thus the luminance was inadequate, and the color rendering index was low.

I claim:

1. A luminescent phosphor composition consisting essentially of particles formed by fusion of a rare earth oxide phosphor, and a sulfate of an alkaline earth metal, wherein the total content of the alkaline earth metal is within a range of from 5–95% by weight, said rare earth oxide phosphor further containing an amount of Eu effective as a phosphor activator, said phosphor having the formula:

$$Ln_2O_3:Eu$$

wherein Ln is at least one element selected from the group consisting of Y, Gd, La and Lu.

2. The luminescent phosphor composition according to claim 1, wherein the content of the sulfate is within a range of from 10 to 95% by weight.

3. The luminescent phosphor composition according to claim 1, wherein the alkaline earth metal is at least one of barium, strontium and calcium.

4. The luminescent phosphor composition according to claim 3, wherein the alkaline earth metal is at least one of barium and strontium.

* * * * *